Aug. 24, 1965  W. F. LAWLER  3,202,047
INVERTED MICROSCOPE WITH U-SHAPED OPTICAL PATH AND TUBULAR
MOUNTS FOR OBJECTIVE AND RELAY LENS SYSTEMS
Filed June 21, 1961  3 Sheets-Sheet 1

INVENTOR.
WILLIAM F. LAWLER
BY Frank C. Parker
ATTORNEY

Aug. 24, 1965

W. F. LAWLER 3,202,047

INVERTED MICROSCOPE WITH U-SHAPED OPTICAL PATH AND TUBULAR
MOUNTS FOR OBJECTIVE AND RELAY LENS SYSTEMS

Filed June 21, 1961

3 Sheets-Sheet 2

*INVENTOR.*
WILLIAM F. LAWLER

BY Frank C. Parker

*ATTORNEY*

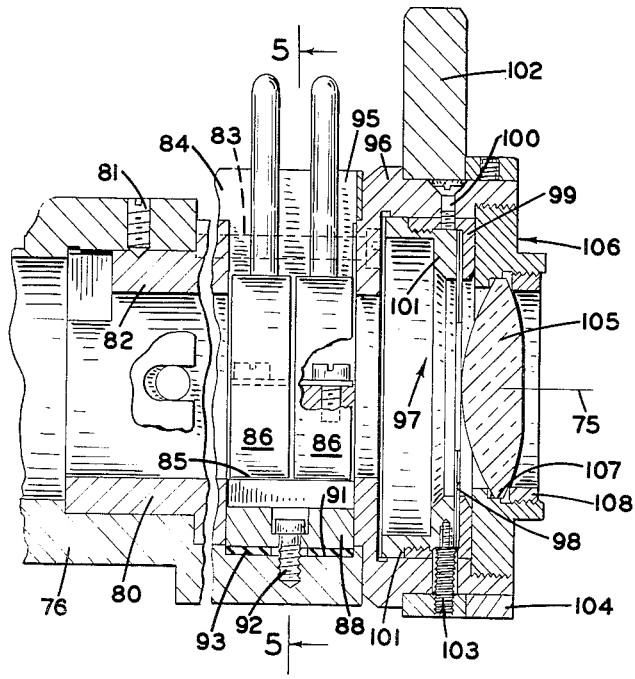
FIG. 4
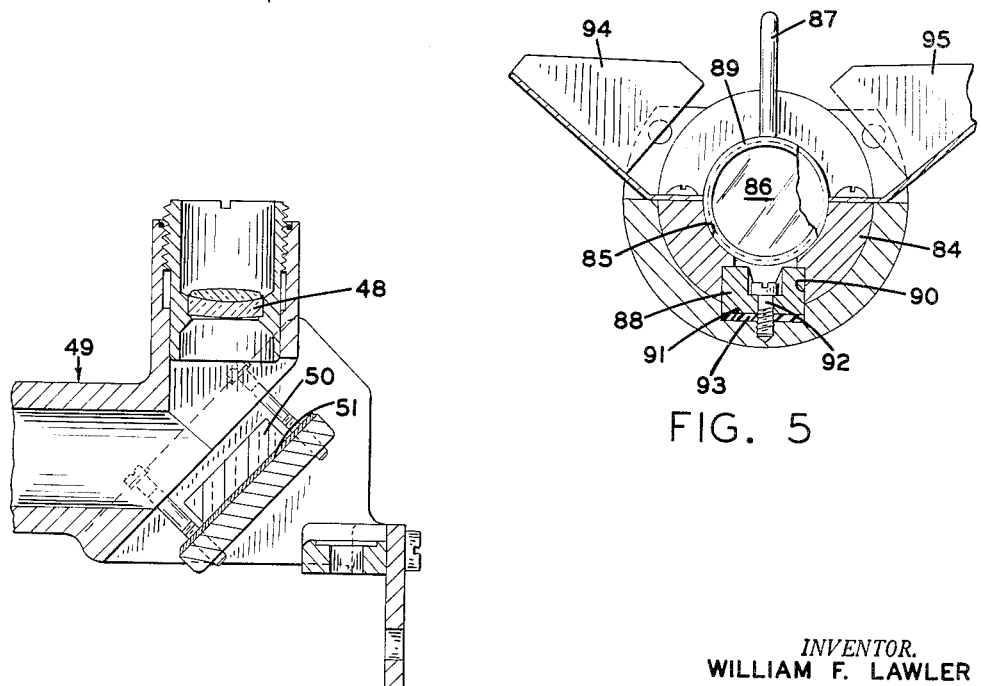
FIG. 6
FIG. 5
INVENTOR.
WILLIAM F. LAWLER
BY Frank C. Parker
ATTORNEY United States Patent Office 3,202,047
Patented Aug. 24, 1965

3,202,047
INVERTED MICROSCOPE WITH U-SHAPED OPTICAL PATH AND TUBULAR MOUNTS FOR OBJECTIVE AND RELAY LENS SYSTEMS
William F. Lawler, Rochester, N.Y., assignor to Bausch & Lomb Incorporated, Rochester, N.Y., a corporation of New York
Filed June 21, 1961, Ser. No. 118,567
2 Claims. (Cl. 88—39)

This invention relates to microscopes and more particularly relates to improvements in the inverted type of microscopes which are preferred for use in metallographic work.

Microscopes of the aforementioned kind are usually large and bulky and consequently require a large and strongly built bench or table structure for adequate support. Such microscopes together with the necessary auxiliary equipment for operation are likely to weigh several hundred pounds and are therefore not portable. Additionally, such microscopes are expensive to purchase and maintain.

In view of the foregoing facts, it is an object of this invention to provide an inverted microscope of novel construction and small size which is light in weight and may be easily carried from place to place by the user.

It is a further object to provide such a microscope which is easy to use and adjust and which is enclosed by a unitary smooth housing which is sturdy in construction, is easy to maintain in clean condition and has good appearance.

Another object of this invention is to provide such an instrument having means for performing critical operations involving such features as the use of a large range of magnification of the image, the use of polarizers and filters and the use of comparison reticles.

A still further object is to provide an inverted microscope having the relative elevations of the ocular parts and stage so arranged that the stage surface is easily viewable while using the oculars without a noticeable shift of viewing position of the observer, said arrangement also providing a compact structure of parts wherein the optical parts are well protected and which is economical to manufacture and is well adapted for efficient use.

Figure 7:
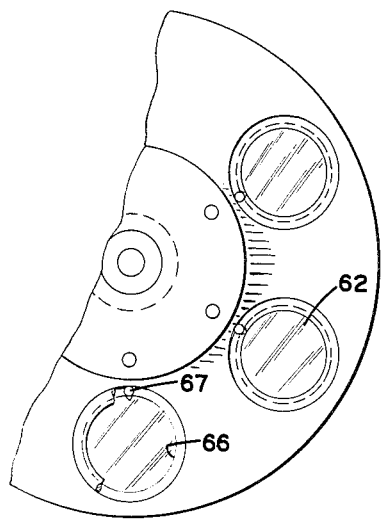
Figure 9:
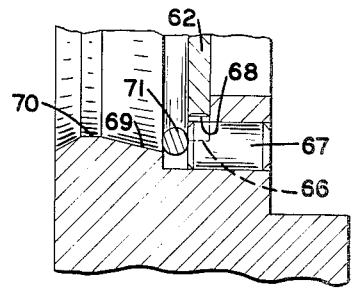
Figure 8:
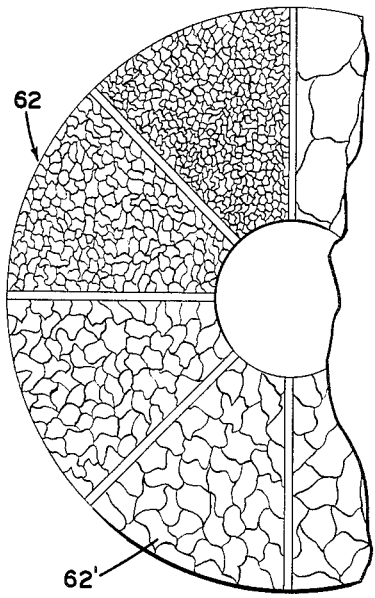
Figure 1:
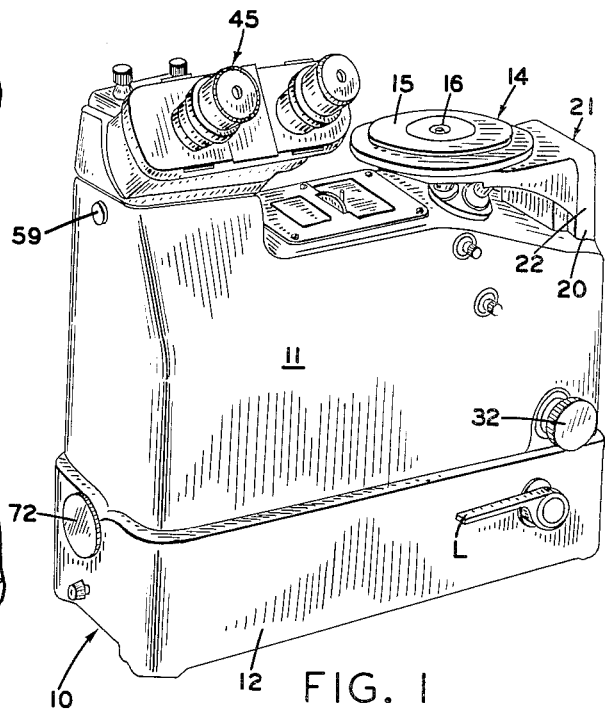
Figure 3:
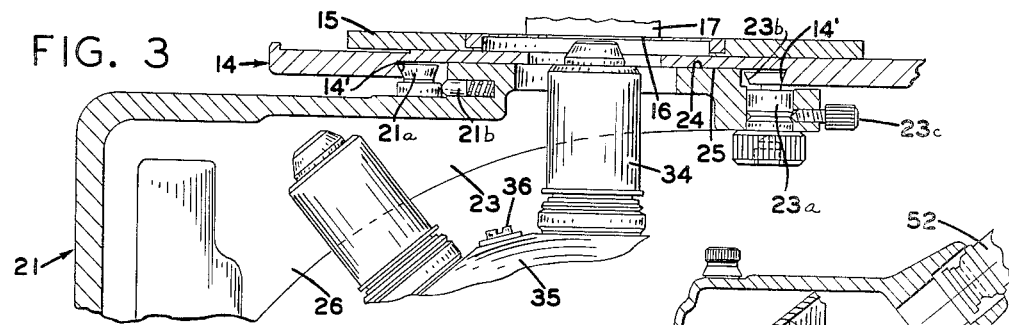
Figure 2:
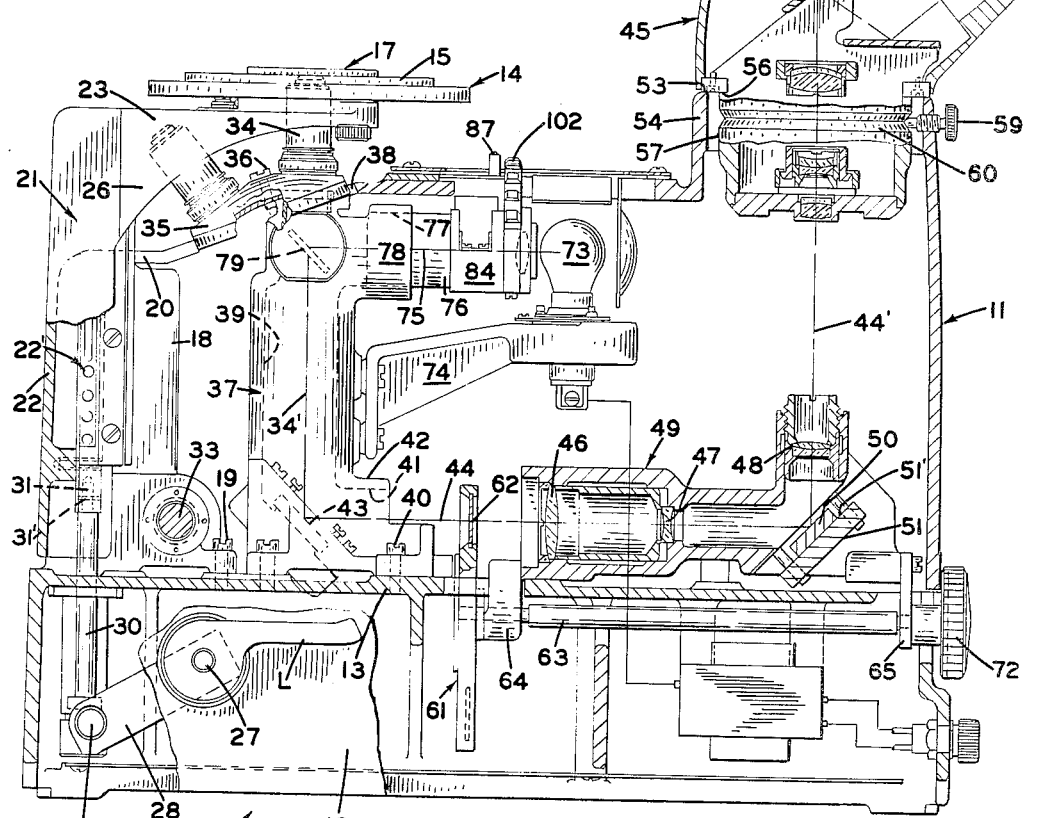

Further objects and advantages will be apparent in the form and arrangement of the parts and in the details of construction thereof by reference to the specification herebelow taken in connection with the accompanying drawings, wherein:

FIG. 1 is a general perspective view of a preferred form of inverted microscope constructed according to the present invention, FIG. 2 is a longitudinal sectional view of the microscope shown in FIG. 1, FIG. 3 is an enlarged and fragmentary sectional view of a part of the structure shown in FIG. 2, FIG. 4 is an enlarged axial sectional view partly broken away showing parts of the illumination system, FIG. 5 is a cross-sectional view taken substantially on the line 5—5 of FIG. 4, FIG. 6 is an enlarged sectional view of certain of the details of the optical system, FIG. 7 is an enlarged side elevational view fragmentarily shown of a part of the microscope, FIG. 8 is a greatly enlarged side elevational view partly broken away of certain structure found in FIG. 7, and FIG. 9 is a greatly enlarged fragmentary sectional view of a part of the structure which is shown within FIG. 7.

With reference to FIG. 1 of the drawing, the numeral 10 designates generally an inverted microscope comprising a housing 11 having a base portion 12 wherein is formed in any suitable manner a shelf 13. As best seen in FIG. 1, the base portion 12 of the housing 11 is rectangular in shape and the upper portions of the housing are of the same rectangular shape generally.

One of the advantageous features of this invention is compactness of its functional parts and accordingly a stage plate 14 having a horizontal working surface 15 is substantially entirely positioned over one end of the housing 11, said stage plate having an aperture 16 therethrough over which an object 17 is held for observation.

The stage plate 14 is mounted preferably by suitable means as shown in FIG. 2 on an upstanding support block 18 which is preferably fixed to the shelf 13 near one end thereof by screws 19. A stage support member 21 is provided for the stage plate 14, said member having a vertical frame portion 22 which is mounted for relative vertical motion by means of suitable intervening anti-friction guide bearings 22' formed on the adjacent faces of the block 18 and frame 22 within a clearance opening 20 in housing 11.

On the upper part of said vertical portion 22 of the frame, a laterally projecting arm 23 is formed which overlies the housing 11 and has a bearing surface 24 formed thereon which contacts a companion bearing surface 25 formed on said stage plate 14.

For holding the stage plate 14 onto its support 21, combination locking and horizontal adjusting means are provided which engage against an inclined annular wall 14' formed in a recess in the underside of the plate. Said means comprises an anchor stud 21a having a conical head portion which fits against the annular wall 14', said stud being movably mounted for outward motion by suitable means, not shown. A spring pressed plunger 21b bears against the stud 21a to force it outwardly against the wall 14'. Said means preferably comprise two anchor studs 23a which have a conical top portion 23b which fits against the annular wall 14' and is stationary while assembled. Anchor stud 23a is rotatably mounted in the arm 23 and the upper end thereof is formed with a conical surface 23b which is eccentric to the axis of rotation of said stud so that when the stud is rotated the stage plate 14 is moved horizontally along two angularly separated axes against the force of the spring plunger 21b. A set screw 23c is threaded into the arm 23 so that it may be tightened against the stud 23a to lock it in adjusted position. Two anchor studs 23a preferably are used.

For stiffening the arm 23 and for partially enclosing and protecting the adjacent and interposed objectives of the microscope, depending reinforcing gussets 26 are preferably integrally formed along the side faces of said arm 23.

Focusing movements of the stage plate 14 are provided by antifriction bearing mechanism which is generally shown by numeral 22', said mechanism being formed in a well known manner on the frame 22 and upright block 18 whereby vertical straight line motion is secured.

Elevation of stage plate 14 for the purpose of freeing and making accessible said objectives, is provided including a manually operated lever L which is pivotally mounted in housing 11 at 27 and is connected to a lift lever 28. A laterally projecting button 29 is provided on lever 28 whereon rests a vertically movable push rod 30 comprised in the lift mechanism. Said push rod 30 is provided with an extension 31 of reduced diameter which is fitted into a bore in the lower end of the movable part of the slide structure 22' and is fixed therein for movements therewith by a cross pin 31'.

For normal operation of the stage plate 14, the usual conventional fine adjustment mechanism, not shown, is provided, said mechanism being housed within the hollow interior of the support block 18 and being actuated by an exterior knob 32 (FIG. 1) which is fixed to an actuating shaft 33 having an operative connection to the fine adjustment mechanism.

Partially positioned within the stage aperture 16 and the underlying hollow cored support structure, one objective 34 of a plurality of objectives is positional so as to focus on the object 17. As stated in the objects of this invention, said objective 34 is held in a turret 35 which is pivotally mounted in a protected location underneath the support arm 23 and between the gussets 26. The rotatable turret 15 is pivotally mounted by means of the pivot screw 36 on the top portion of an upright frame member 37 wherein the screw is threaded so as to support the lens turret 35 in a clearance opening 38 formed in the upper wall of housing 11. The upright frame member 37 is provided with a sight opening 39 therethrough and said member is secured onto the horizontal shelf 13 in a position inwardly of the block 18 in any preferred manner such as by the screws 40 which extend through suitable clearance holes in the base of the frame member 37 and are threaded into the shelf.

Principally for achieving compactness of structure, the optical path in the present invention is folded into an upright U-shape wherein the axis 34' of the objective 34 is in fact one of the upright portions of said optical path. A second opening 41 at the base of the frame member extends horizontally through a lateral portion 42 of the frame member 37 from the opening 39 to the outside thereof. At the intersection of openings 39 and 41, an inclined mirror 43 is fixed in any suitable manner so as to deflect the line of sight along a horizontal portion 44 of said optical path, said portion being coplanar with axis 34'.

On an opposite upright portion 44' of the optical path, an ocular member 45 is aligned and between the mirror 43 and ocular member 45 a relay lens system consisting of the lenses 46, 47 and 48 is positioned partly on the horizontal part of the optical path for relaying the image formed by the objective along the optical path to the ocular member.

A combination lens and mirror mount 49 is provided for holding the lenses 46, 47 and 48 and a second inclined mirror 50 which is fixed between lenses 47 and 48 on an inclined seat 51 so as to deflect the image rays vertically from the axis of lenses 46 and 47 through the lens 48 into coincidence with the second vertical axis 44' of the U-shape optical path as shown in FIG. 2. The unitary mount 49 advantageously holds optical members 46, 47, 48 and 50 in good optical alignment with each other reliably and the mount is adjustably secured for alignment purposes by any desired means such as screws, not shown, which extend through openings in the mount 49 and are threaded into the shelf 13. Adjustably attached to the corner portion of the mount 49 in any desired manner such as the adjustable studs 51', is an inclined plate 51 whereon the mirror 50 is secured by any suitable means.

One of the distinctive features of this invention is found in the excellent arrangement of the component parts for obtaining good visibility of the stage surface 15 without substantially changing the operator's viewing position when using the oculars 52. As shown in FIG. 2, this feature is provided by forming a horizontal abutment surface 53 on an elevated portion 54 at the end of the housing 11 opposite to the stage. The ocular member 45 which holds the oculars 52 has a mounting surface 56 formed thereon which is adapted to seat on the abutment surface 53 and hold said oculars at such a height that the stage is in full view for arranging objects thereon with a minimum of shift of viewing position. An annular bearing surface 57 is formed on the ocular member 45 projecting downwardly from the abutment surface 55 through a loose fitting opening 58 in the housing portion 54. The ocular member 45 is held therein by a plurality of retaining screws 59 which are threaded into corresponding apertures extending through the wall of the housing portion 54 and engage at their ends in an annular V-groove 60 formed in member 56.

Another feature of this invention is the provision of a reticle wheel 61 having a plurality of transparent reticle plates 62 held therein in circular array. The wheel 61 is rotatably mounted on a shaft 63 in suitable bearings 64 and 65 which are fixed to the shelf 13 in such a position that the plates 62 may be aligned selectively and individually with the horizontal axis 44 by rotation of the wheel. As best illustrated in FIG. 7 and FIG. 9 of the drawings, the reticle wheel 61 is provided with a plurality of circular seating surfaces 66 on which the plates 62 are held non-rotatably by any suitable means such as the pins 67 which are fixed in the cell and which engage in corresponding notches 68 formed in the peripheries of said plates. For holding the plates 62 on the seating surfaces 66 in such a manner as to be easily demountable, a tapered annular groove 69 is formed in the adjacent opening 70, said groove having its largest diameter next to said surface 66. In said groove 69 an expansion ring 71 is seated in the deepest part 69 thereof and bearing against the plate 62 for retaining the plate on its seating surface 66.

The reticle wheel 61 is so longitudinally held by its bearings 64 and 65 that the reticle plates 62 are positioned in a plane which is normal to horizontal axis 44 and includes the back focal point of the objective 34 so that the reticle pattern appears sharply focused in the field of view of the instrument. A knob 72 is fixed to the reticle wheel shaft 63 externally of the housing 11 for rotating said wheel. Each reticle plate 62 is transparent and is provided with a preferred pattern or combination of patterns as shown in an enlarged view in FIG. 8 according to the requirements of the work in progress. The various patterns 62' on the reticle plates 62 serve as comparison criteria in metallurgical examinations and the integration of this feature into the instrument in a compact and efficient manner is well shown in FIGS. 7 and 8 of the drawings.

Further emphasizing compactness of design of the inverted microscope 10, a light source in the form of a lamp 73 is mounted on an independent bracket 74 which extends laterally from and is secured to the upright objective support member 37 within housing 11. Aligned with lamp 73 on a horizontal axis 75 is a mounting sleeve 76 which is fitted into an opening 77 in a boss 78 which projects laterally from the top of the hollow objective frame member 37. The short horizontal axis 75 intersects the vertical objective axis 34, and coincident with the point of intersection a semi-reflective inclined mirror 79 is fixed within said frame member 37, the angle of inclination of the mirror being such as to direct illumination episcopically upon said object through the objective 34.

In the end of the mounting sleeve 76 nearest to the lamp 73, a bushing 80 is fitted and is secured therein by any desired means such as the screws 81. Said bushing 80 is provided with a bore 82 concentric with the short horizontal axis 75.

Secured to the end face of the bushing 80 in any preferred manner such as the screws 83, is a cell mounting sleeve 84. Said sleeve 84 is provided internally with a semi-cylindrical seating surface 85 whereon one or more optical cells 86 containing polarizers or filters are held in alignment on the horizontal axis 75. The upper half of the sleeve 84 is removed above the cells 86 as best shown in FIG. 5 so that the optical cells 86 may be inserted easily from the top onto the seating surface 85 by the use of the handles 87. This construction permits the rotation of the cells 86 on the seating surfaces 85 through nearly 180° which is particularly advantageous for polarizing cells.

A further novel feature of the present invention which is particularly useful in a portable instrument is the provision of magnetic means for holding the polarizer cell 86 on the seating surface 85 in any desired angular position reliably without the use of superposed mechanism such as clamps and springs clips. Said magnetic means comprise a magnet 88 and magnetizable cell frames 89 as shown in FIG. 5, the magnet being contained within a recess 90 in the lower side of the sleeve 84. A magnet supporting surface 91 is formed in the lower part of mounting sleeve 76 and the magnet 88 is retained thereon by means of a cap screw 92 which extends through a clearance hole in the magnet and is threaded into said mounting sleeve.

Normally the magnet 88 is so located that no part thereof touches the cells 86 whereby the cells are not seized by the magnet. Furthermore, means are provided for adjusting the effective magnetic force of the magnet 88, comprising a soft rubber or other yielding member 93 which is interposed between the magnet supporting surface 91 and the bottom surface of the magnet, so that by adjustment of the screw 92 a change of effective magnetic force on the cells is effected.

As seen in FIG. 5, the side chutes 94 and 95 are provided to serve as guides when inserting the cells 86 in operative position on the seating surface 85 and also to prevent the cells from dropping into the clearance space around said surface.

Attached to the mounting sleeve 76 by the screws 83 is an annular casing 96 positioned adjacent to the cell mounting sleeve 84, said casing being constructed to operably position a variable diaphragm mechanism generally indicated by numeral 97 therein. Said mechanism 97 comprises a set of diaphragm blades 98 which are attached pivotally by means not shown at one end to a stationary ring 99 which is fixed in the casing 96, by screws 100. The other ends of the diaphragm blades 98 are pivotally secured by means, not shown, to an operating ring 101 which is rotatably mounted within the casing 96 and is rotated by a manual control ring 102 which is rotatably journaled on the outer diameter of the casing by means of a connecting screw 103 which is threaded into the manual control ring and extends through an angularly elongated slot formed in casing 96. A stop collar 104 fixed to the casing 96 is provided to retain the control ring 102 in assembled position.

Within the casing 96 and aligned on the horizontal axis 75, a condenser lens 105 is provided as shown in FIG. 4 for condensing the light coming from the aligned lamp 73. For mounting the lens 105, an annular lens holder 106 having a lens seat 107 formed therein, whereon the lens 105 is located, is provided, said lens being held thereon by a clamp ring 108 which is threaded into said holder so as to bear against the lens.

Certain of the many advantages of the above-described mechanism are worthy of reemphasizing, these being:

(a) The superior position of the oculars above the stage so that all of the stage surface is visible for adjustment of the object thereon and for lateral adjustments of the stage without changing the observer's position at the oculars.

(b) The extreme compactness and light weight of the instrument whereby the instrument is easily portable and requires little bench space when in use or in storage, the primary reason for compactness being the U-shaped optical path contained therein, (c) The easy accessibility of all controls, (d) The integration into the instrument of mechanism for controlling illumination (diaphragm, polarizer, filter combination), for comparing interchangable specimen patterns (by providing multiple reticle patterns).

Although only certain forms of this invention have been shown and described in detail, other forms are possible and changes may be made in the arrangement and construction of the details thereof without departing from the spirit of the invention as defined in the claims appended herebelow.

I claim:

1. An inverted microscope having a U-shaped optical path comprising an elongated housing, a horizontal stage on which a specimen is held, said stage being operativley carried by said housing adjacent to one end of the upper side thereof, a microscope objective mounted in vertical alignment with and focused on said specimen, a generally tubular upright frame member fixed in said housing in optical alignment with and beneath said objective, means operatively constructed on the top of said frame member for mounting said objective thereon in communication with the interior of the member, a laterally directed tubular frame part formed on said frame member and opening into the upper hollow part of said frame member, a lamp bracket carried by said frame member and a lamp mounted thereon in alignment with said lateral tubular frame part so that light is directed therethrough, a beam divider and means for supporting the divider inclinedly at the junction of the axes of the upright frame member and its lateral tubular part in optical alignment with said objective and said lamp so as to illuminate said specimen episcopically, means forming a side opening in the lower part of said frame member, a first plane mirror, means for mounting said mirror in a position substantially 45° to the axis of said objective and in horizontal alignment with said side opening so as to deviate incident image rays along a horizontal portion of optical axis whereon a primary image is formed by the objective, a unitary relay lens and mirror mount located in a fixed position is said housing on said horizontal portion of axis, said mount consisting of a tubular horizontal part joined at one end to a tubular vertical part, a second mirror, a mirror seat formed at the junction of the rorizontal and vertical parts at substantially 45° to said horizontal axis portion whereon the second mirror is fixed so as to deviate said image rays vertically and form the vertical leg of a U-shaped optical system, a first positive lens and a negative lens mounted in spaced relation thereto in said horizontal part and a second positive lens mounted in said vertical part in optical alignment with the other two lenses and mirror so as to relay said image rearwardly to form a relayed image, an inclined ocular member for viewing said relayed image, and rotatable mounting mechanism for said member formed cooperatively on said housing and ocular member for holding the ocular member on the housing, said mechanism including an annular surface whereon the ocular member is supported, said surface being formed horizontally on the upper part of the housing opposite to said stage whereby the ocular is positioned in elevation favorably for convenient viewing of said stage.

2. An inverted microscope as set for in claim 1 wherein said mounting mechanism for the ocular member includes a hollow elevated extension formed on the upper side of said housing in vertical alignment with said second mirror and whereon the aforesaid annular flat bearing surface is formed horizontally about its upper rim at approximately the level of the stage, a companion annular bearing surface formed on said ocular member for contact with the first annular surface, a cylindrical body formed on said ocular member below said annular bearing surface and freely held within said hollow extension, a pair of annular mutually convergent surfaces which form a peripheral V groove in said body lying at a constant vertical distance from said annular surfaces, and a plurality of equally angularly spaced retaining screws threaded radially through the wall of said elevated extension and engaging in said V groove whereby said ocular member is secured in the housing for rotational and radial adjustments of the body within the elevated extension.

References Cited by the Examiner

UNITED STATES PATENTS

| | | | |
|---|---|---|---|
| 373,634 | 11/87 | Bausch | 88—39 |
| 2,303,906 | 12/42 | Benford et al. | 88—39 |
| 2,349,457 | 5/44 | Osterberg et al. | 88—40 |
| 2,389,544 | 11/45 | Peck et al. | 88—14 |
| 2,518,240 | 8/50 | Lowber et al. | |
| 2,592,339 | 4/52 | Rollat. | |
| 2,677,987 | 5/54 | Gallasch | 88—39 |
| 2,789,461 | 4/57 | Leitz et al. | 88—39 |
| 2,847,906 | 8/58 | Santoni | 88—29 |
| 2,910,913 | 11/59 | Michel | 88—39 |
| 2,953,970 | 9/60 | Maynard | 88—113 |
| 3,038,374 | 6/62 | Humel | 88—39 |

FOREIGN PATENTS 651,367   3/51   Great Britain.

DAVID H. RUBIN, *Primary Examiner*.